(12) United States Patent
Forni et al.

(10) Patent No.: US 12,466,369 B2
(45) Date of Patent: Nov. 11, 2025

(54) METHOD FOR CONTROLLING THE WHEEL SLIP IN A BRAKING SYSTEM WITH B-b-W TECHNOLOGY OF A VEHICLE AND SYSTEM THEREOF

(71) Applicant: BREMBO S.p.A., Curno (IT)

(72) Inventors: Fabrizio Forni, Curno (IT); Luca Ugolini, Curno (IT); Luca D'Avico, Curno (IT); Davide Paolini, Curno (IT); Alessandro Rossi, Curno (IT); Davide Isgro', Curno (IT)

(73) Assignee: Brembo S.p.A., Bergamo (IT)

( * ) Notice: Subject to any disclaimer, the term of this patent is extended or adjusted under 35 U.S.C. 154(b) by 273 days.

(21) Appl. No.: 18/004,960

(22) PCT Filed: Jul. 13, 2021

(86) PCT No.: PCT/IB2021/056286
§ 371 (c)(1),
(2) Date: Jan. 10, 2023

(87) PCT Pub. No.: WO2022/013732
PCT Pub. Date: Jan. 20, 2022

(65) Prior Publication Data
US 2023/0303043 A1 Sep. 28, 2023

(30) Foreign Application Priority Data
Jul. 15, 2020 (IT) .................. 102020000017119

(51) Int. Cl.
*B60T 8/1761* (2006.01)
*B60T 8/1763* (2006.01)

(52) U.S. Cl.
CPC ...... *B60T 8/17616* (2013.01); *B60T 8/17636* (2013.01); *B60T 2270/82* (2013.01); *B60Y 2400/81* (2013.01)

(58) Field of Classification Search
CPC .................. B60T 8/17616; B60T 8/17636
See application file for complete search history.

(56) References Cited

U.S. PATENT DOCUMENTS

| | | | |
|---|---|---|---|
| 5,312,170 A | 5/1994 | Erban et al. | |
| 5,711,585 A * | 1/1998 | Tozu | B60T 8/268 303/146 |

(Continued)

FOREIGN PATENT DOCUMENTS

| | | |
|---|---|---|
| DE | 102004008265 A1 | 9/2005 |
| DE | 102004062722 A1 | 6/2006 |

(Continued)

OTHER PUBLICATIONS

European Patent Office, International Search Report, issued in PCT/IB2021/056286, Oct. 19, 2021, Rijswijk, NL.

*Primary Examiner* — John Kwon
(74) *Attorney, Agent, or Firm* — Marshall-Melhorn, LLC

(57) ABSTRACT

A method for controlling wheel slip in a braking system of a vehicle includes receiving, by an input interface module of a slip control module, information representative of the vehicle and information representative of an estimate of the status of the vehicle, outputting, by the input interface module, input wheel slip control information, determining, by a parameter self-loading module, based on information representative of the vehicle and information representative of an estimate of the status of the vehicle, wheel slip control parameters, determining, by a plurality of wheel slip control enabling modules of the slip control module, a plurality of enabling signals of the wheel slip control, and determining, by each closed-loop wheel slip control module of a plurality of closed-loop wheel slip control modules of the slip control module a setpoint value of a control variable to be applied to a respective corner of the vehicle to minimize error (Continued)

between the defined slip setpoint and the estimated wheel slip value.

12 Claims, 10 Drawing Sheets

(56) References Cited

U.S. PATENT DOCUMENTS

| | | | |
|---|---|---|---|
| 10,272,913 B2* | 4/2019 | Boisvert | B60L 58/12 |
| 2021/0197778 A1* | 7/2021 | Shi | B60T 8/1761 |
| 2024/0383340 A1* | 11/2024 | Carbone | B60L 3/108 |

FOREIGN PATENT DOCUMENTS

| | | |
|---|---|---|
| EP | 2351675 A1 | 8/2011 |
| JP | H05502840 A | 5/1993 |
| JP | H10157601 A | 6/1998 |
| WO | 2017215751 A1 | 12/2017 |
| WO | 2019057386 A1 | 3/2019 |

\* cited by examiner

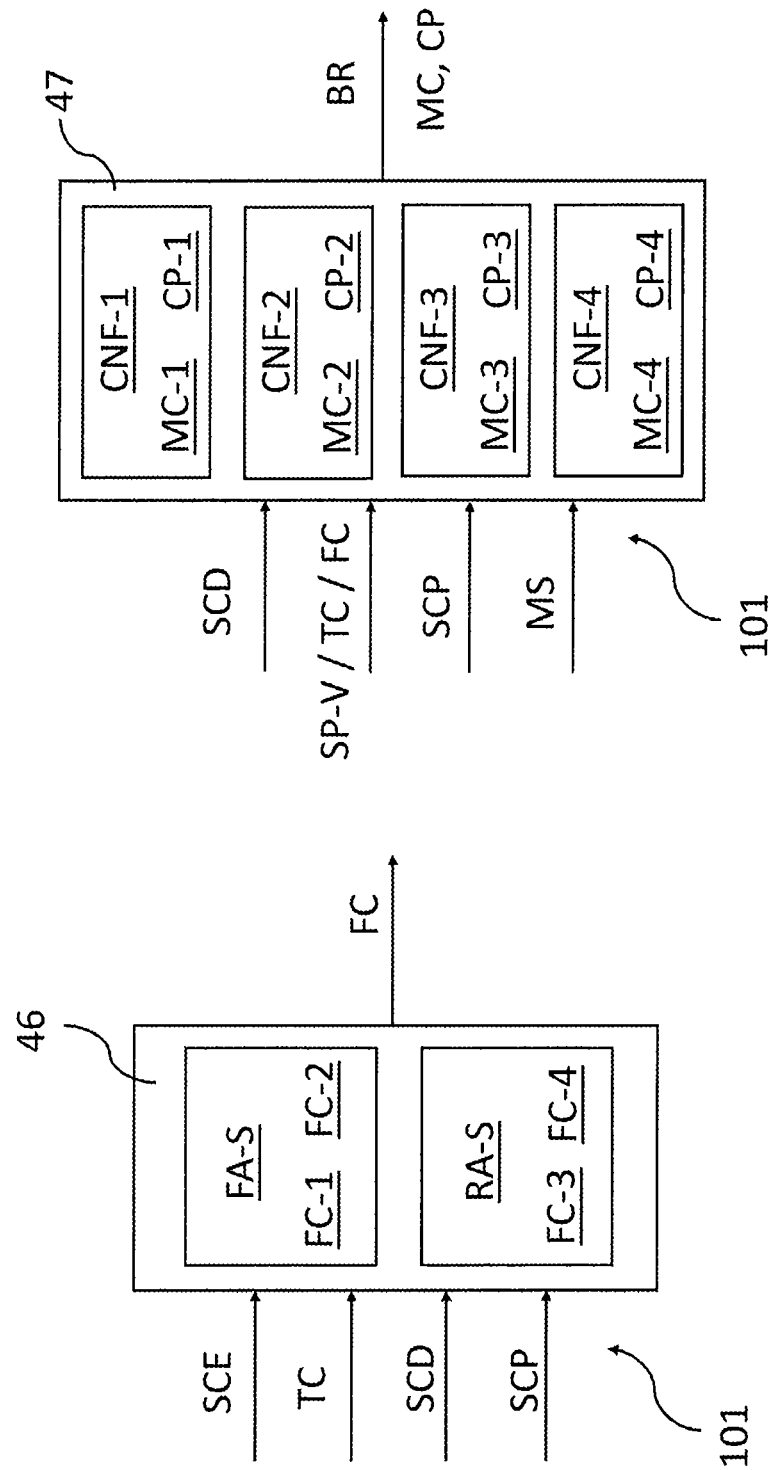

METHOD FOR CONTROLLING THE WHEEL SLIP IN A BRAKING SYSTEM WITH B-b-W TECHNOLOGY OF A VEHICLE AND SYSTEM THEREOF

CROSS-REFERENCE TO RELATED APPLICATIONS

This application is a National Phase Application of PCT International Application No. PCT/IB2021/056286, having an International Filing Date of Jul. 13, 2021 which claims priority to Italian Application No. 102020000017119 filed Jul. 15, 2020, each of which is hereby incorporated by reference in its entirety.

FIELD OF THE INVENTION

The present invention relates to a braking system of a vehicle, in particular to a method for controlling the wheel slip in a braking system with B-b-W technology of a vehicle and system thereof.

BACKGROUND OF THE INVENTION

Wheel slip control is very important in a vehicle and is added to the configuration of a braking system, which, in this respect, must be able to guarantee a high level of control optimization and flexibility.

In traditional braking systems, characterized by actuation circuits provided with numerous valves, in which braking management is typically performed through discrete-cycle control algorithms (cyclic braking demand application-release), there are architectures which do not allow, for example, a separation between the wheel slip control of a vehicle and the control of the continuous force modulation of an actuator adapted to impart the braking to a wheel, whereby limiting in practice any kind of optimization and flexibility of the overall method for controlling the braking system to achieve optimal performance in terms of wheel control and, at the same time, limiting tuning techniques to empirical methods.

The most recent innovative architectures suggest braking systems provided with electronic braking systems with B-b-W ("Brake-by-Wire", braking through electric connection) technology, in which, for example, the braking action of a brake caliper on a wheel is achieved by using one or more electro-mechanical or electro-hydraulic actuators.

However, based on the aforesaid considerations relative to conventional braking systems, the methods for controlling the slip of a wheel of a vehicle usable in a conventional braking system are not optimal for application in a braking system provided with an electronic braking system with B-b-W technology.

Nowadays, the need is thus felt to define a specific and optimized mode for controlling the wheel slip of a vehicle also for a braking system provided with an electronic brake system with B-b-W technology, with the possibility to configure such a control mode as a function of evaluations of the status of one or more wheels and/or of the vehicle itself.

SUMMARY OF THE INVENTION

It is an object of the present invention to devise and make available a method for controlling the wheel slip in a braking system of a vehicle which makes it possible to avoid, at least partially, the drawbacks complained of above with reference to the prior art and, in particular, such as to allow the possibility of configuring such a control mode as a function of evaluations of the status of one or more wheels and/or of the vehicle itself, ensuring greater flexibility and further privileging and optimizing the responsiveness and the performance of the wheel slip control as well as the braking comfort.

Such an object is achieved by a method as described and claimed herein.

The present invention further relates to a system for controlling the wheel slip in a braking system of a vehicle.

Further advantageous embodiments are the object of the dependent claims.

BRIEF DESCRIPTION OF THE FIGURES

Further features and advantages of the method and system according to the invention will be apparent from the following description of preferred embodiments, given by way of indicative, non-limiting examples, with reference to the accompanying figures, in which:

FIGS. 4a-4g diagrammatically shows respective components of a system for controlling the wheel slip in a braking system of a vehicle according to the present invention;

DETAILED DESCRIPTION

Figure 1:
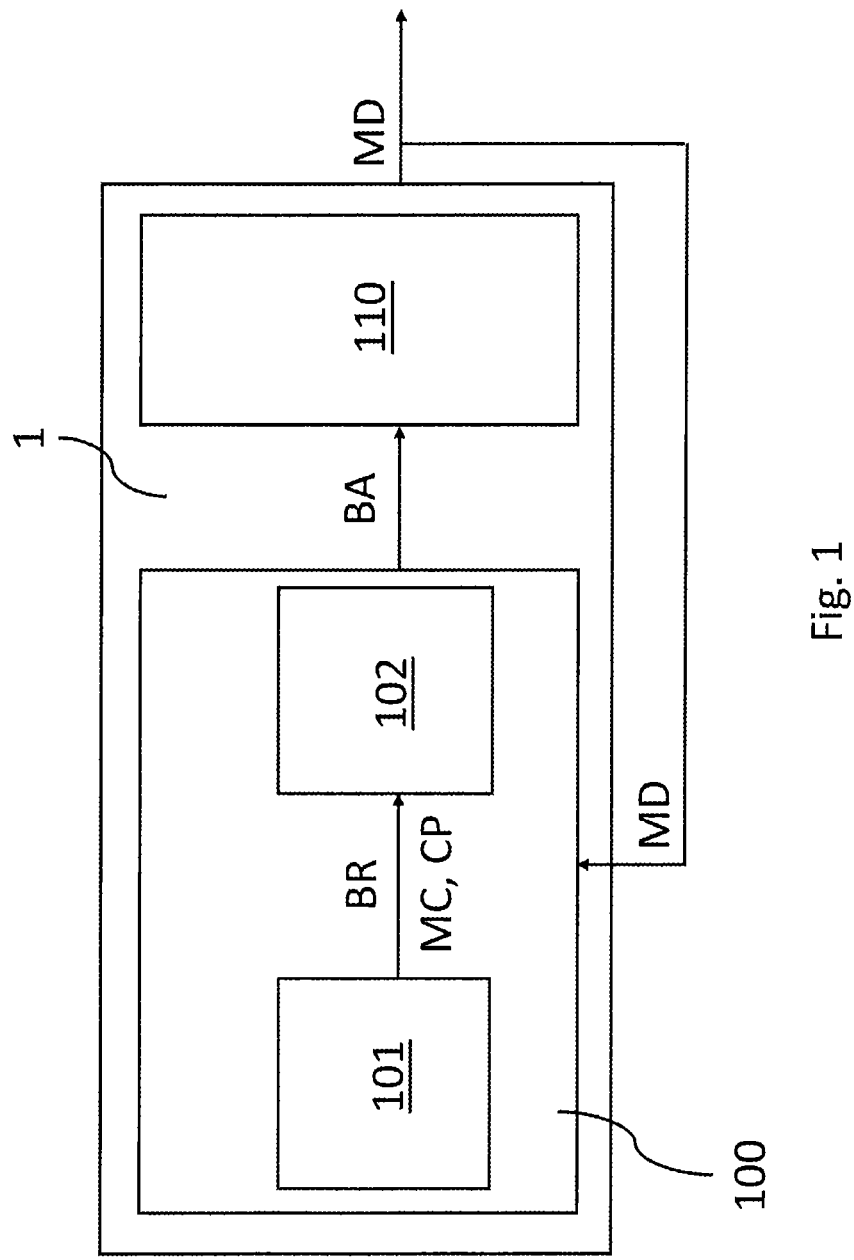
FIG. 1 shows, by means of a block chart, a vehicle and an electronic braking system with Brake-by-Wire technology in which a system for controlling the wheel slip in a braking system of a vehicle object of the present invention is employable.

With reference now to the figures, reference numeral 100 indicates as a whole a system for controlling the wheel slip in a braking system of a vehicle, hereinafter also simply system, according to the present invention.

It is worth noting that equal or similar elements in the figures will be indicated by the same numeric or alphanumeric references.

For the purposes of the present description, "vehicle", shown only diagrammatically in the figures, means any vehicle or motorcycle, also of commercial type, having two, three, four, or more wheels.

Furthermore, "braking system" means the whole of all the components (mechanical and/or electric or electronic, also the brake fluid) which contribute to generating the service braking of a vehicle or to generating the parking-braking of a vehicle.

The system 100 is an electronic system with Brake-by-Wire technology.

The system 100 is operatively associated with a vehicle 1.

In greater detail, the system 100 comprises a slip control module 101.

Wheel slip means the behavior of a wheel due to the relative difference between the wheel speed and the vehicle speed.

The slip control module 101 is, e.g., a hardware module or software logic module in a main hardware module of the braking system or more in general of the vehicle 1.

The system 100 further comprises a plurality of actuator modules 102.

Each module of the plurality of actuator modules 102 comprises a respective actuator control module and a respective actuator adapted to implement a braking command based on the control received from the respective actuator control module.

Each actuator control module is, e.g., a hardware module or software logic module in a main hardware module of the braking system or more in general of the vehicle 1.

Each actuator is either an electro-mechanical type or an electro-hydraulic type.

The slip control module 101 is configured to receive information MD representative of the vehicle 1 and, based on such information MD, send one or more commands representative of braking requests BR to the plurality of actuator modules 102.

For the purposes of the present description "information MD representative of the vehicle" means detected and/or estimated information coming from detecting devices (real or virtual sensors) installed on the vehicle, i.e. at the corners (front or rear of the vehicle), but not necessarily only related to the braking system of the vehicle.

The plurality of actuator modules 102, based on the one or more commands representative of braking requests BR received from the slip control module 101, is configured to apply one or more braking actions BA on the corners 110 of the vehicle 1.

It is worth noting that "braking action" means a braking force/torque applicable by an actuator module on a corresponding wheel.

It is worth noting that the slip control module 101, in addition to sending one or more braking request BR commands, is configured to provide control modes MC and configuration parameters CP, which will be described in greater detail below, to the plurality of actuator modules 102.

Figure 2:
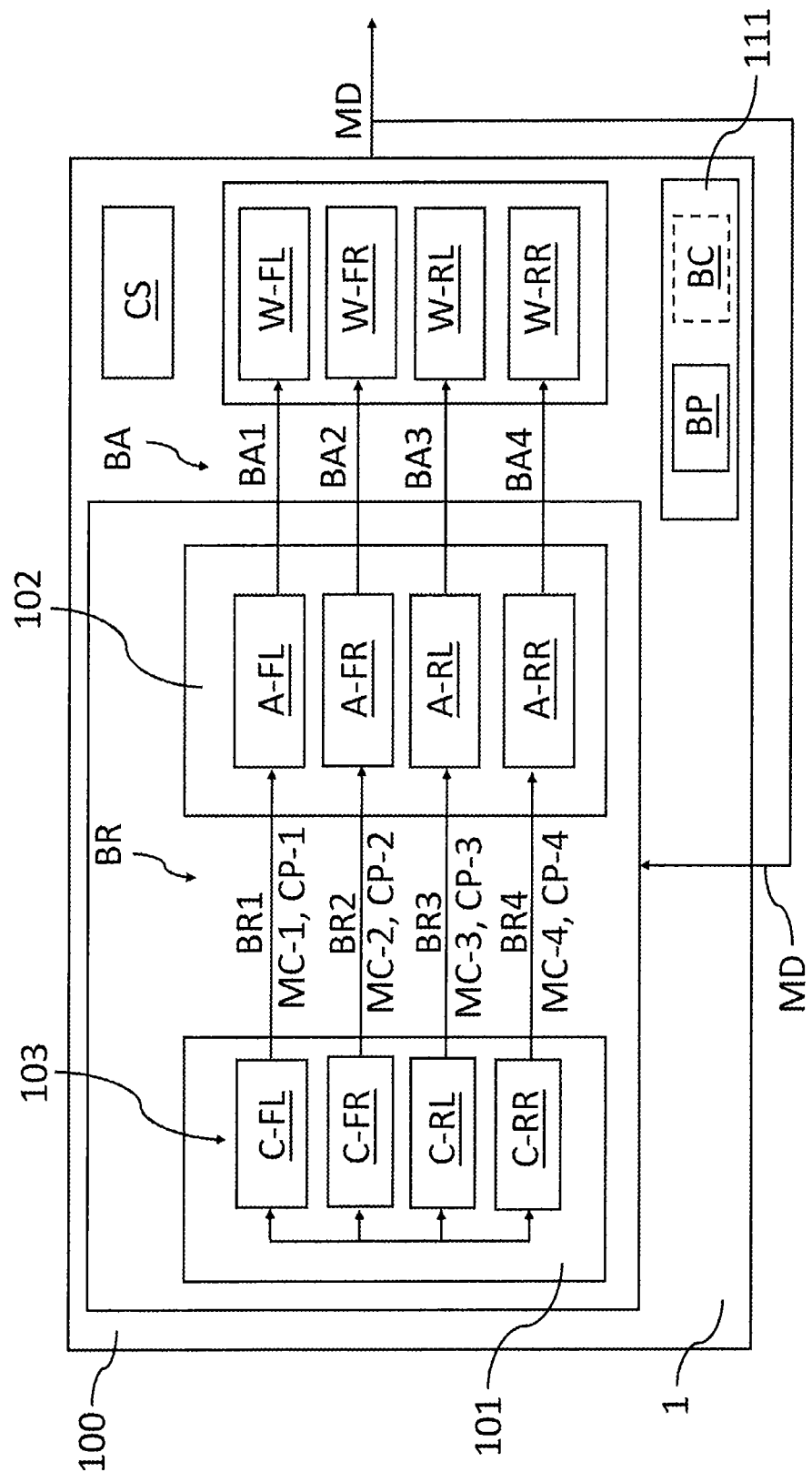
FIG. 2 shows, by means of a block chart, the vehicle and the electronic braking system with Brake-by-Wire technology in FIG. 1 with the detail of the respective components inside them.

With reference to FIG. 2, the wheel slip control module 101 comprises a is plurality of wheel slip control sub-modules 103.

A wheel slip control sub-module of such a plurality of wheel slip control sub-modules 103 is configured to control a respective corner of the vehicle 1.

In greater detail, if the vehicle 1 has four wheels (two on a front axle and two on a rear axle), the plurality of wheel slip control sub-modules 103 comprises:

a first wheel slip control sub-module C-FL of the front left corner;

a second wheel slip control sub-module C-FR of the front right corner;

a third wheel slip control sub-module C-RL of the rear left corner; and a fourth wheel slip control sub-module C-RR of the rear right corner.

With reference again to FIG. 2, the plurality of actuator control modules 102 are distributed on the corners of the vehicle 1.

In greater detail, again if the vehicle 1 has four wheels (two on a front axle and two on a rear axle), the plurality of actuator control modules 102 comprises:

a first actuator control module A-FL of the front left corner;

a second actuator control module A-FR of the front right corner;

a third actuator control module A-RL of the rear left corner; and a fourth actuator control module A-RR of the rear right corner.

The one or more commands representative of braking requests BR sent from the slip control module 101 to the plurality of actuator control modules 102 comprise:

a first braking request BR1 provided by the first wheel slip control sub-module C-FL of the front left corner to the first actuator control module A-FL of the front left corner;

a second braking request BR2 provided by the second wheel slip control sub-module C-FR of the front right corner to the second actuator control module A-FR of the front right corner;

a third braking request BR3 provided by the third wheel slip control sub-module C-RL of the rear left corner to the third actuator control module A-RL of the rear left corner; and a fourth braking demand BR4 provided by the fourth wheel slip control is sub-module C-RR of the rear right corner to the fourth actuator control module A-RR of the rear right corner.

It is worth noting that each wheel slip module, in addition to sending a respective braking request BR1, BR2, BR3 or BR4, is configured to provide control modes MC-1, MC-2, MC-3 or MC-4 and configuration parameters CP-1, CP-2, CP3, or CP-4, which will be described in greater detail below, to the plurality of actuator modules 102.

The one or more braking actions BA that the plurality of actuator modules 102 can implement on the vehicle 1 comprise:

a first braking action BA1 provided by the first actuator control module A-FL of the front left corner to the front left wheel W-FL of the vehicle 1;

a second braking action BA2 provided by the second actuator control module A-FR of the front right corner to the front right wheel W-FR of the vehicle 1;

a third braking action BA3 provided by the third actuator control module A-RL of the rear left corner to the rear left wheel W-RL of the vehicle 1; and a fourth braking action BA4 provided by the fourth actuator control module A-RR of the rear right corner to the rear right wheel W-RR of the vehicle 1.

It is worth noting that in FIG. 2, the vehicle 1 further comprises a chassis CS to which the front axle comprising the front left wheel W-FL and the front right wheel W-FR and the rear axle comprising the rear left wheel W-RL and the rear right wheel W-RR are operatively connected.

Furthermore, again as diagrammatically shown in FIG. 2, the vehicle 1 comprises a braking request module 111 configured to impart a braking request to the vehicle 1.

The braking request that the braking request module 111 can impart is one of the items of information MD representative of the vehicle which is provided to the slip control module 101.

In an embodiment, shown in FIG. 2, the braking request module 111 comprises a brake pedal BP adapted to allow a driver of the vehicle 1 to impart a braking request to the vehicle 1.

In this embodiment, the braking request means the position and/or pressure of the brake pedal.

According to a further embodiment, either alternative or in combination with the preceding one and shown with dashed lines in FIG. 2, the braking request module 111 comprises one or more control logics BC configured to impart a braking request, such as, e.g., an automatic vehicle driving assistance logic, e.g., of the Autonomous Emergency Brake (AEB) type, automatic autonomous driving logic, and so forth.

Figure 3B:
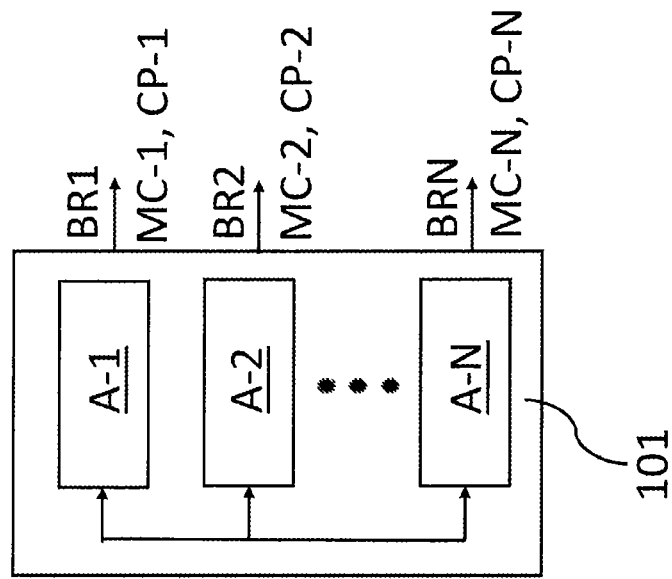
FIGS. 3a, 3b, and 3c show, by means of respective block charts, a system for controlling the wheel slip of a vehicle according to various embodiments of the invention.
Figure 3A:
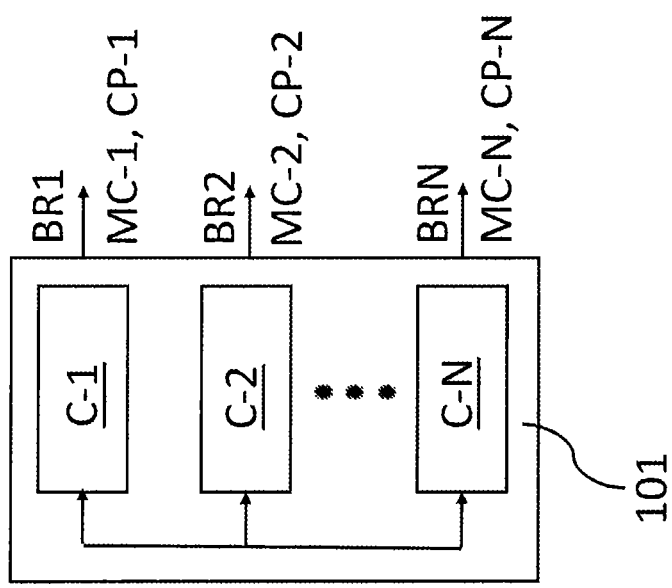
Figure 3C:
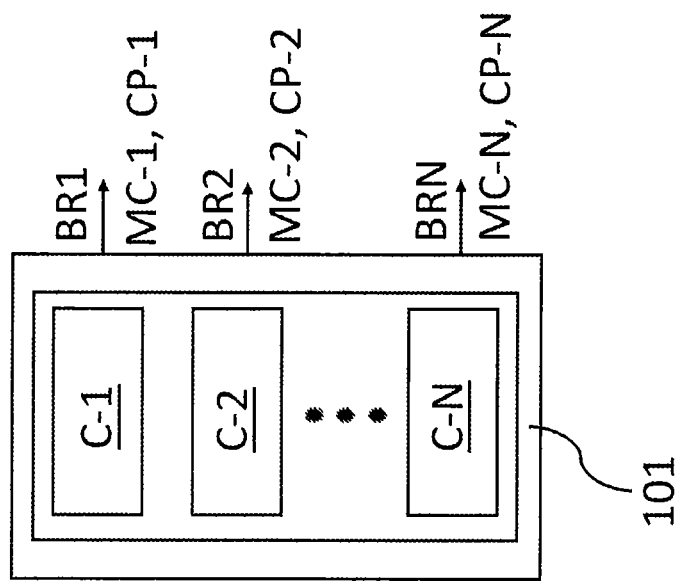

According to various embodiments, diagrammatically shown in FIGS. 3a, 3b, and 3c, the system 100 is configurable from the software point of view based on the distribution of one or more electronic control units in the vehicle 1.

The one or more electronic control units have several tasks, one of which is implementing the slip control module 101.

It is worth noting that a single electronic control unit can be configured to implement up to N wheel slip control sub-modules.

In the case of a vehicle having N corners and a single electronic control unit configured to implement all N wheel slip control sub-modules, the system 100 is named centralized.

Instead, in the case of a vehicle with N corners and N electronic control units, each of which is configured to implement a single wheel slip sub-module, the system 100 is named decentralized.

This modularity of the system 100 according to these embodiments allows for greater flexibility of the system 100 itself to the various distribution configurations of one or more electronic control units in the vehicle 1.

According to an embodiment, shown in FIG. 3a, the system 100, in particular, the plurality of wheel slip control submodules 103 distributed on single corners C-1, C-2, C-N of the vehicle 1, can be configured to control, in a coordinated manner, a number of corners of the vehicle either fewer than or equal to the overall number of corners of the vehicle 1.

In FIG. 3a: BR-1, BR2, . . . , BR-N are commands representing braking requests for the single corners C-1, C-2, . . . , C-N, respectively; MC-1, MC-2, . . . , MC-N represent control modes of the actuator control module of the single corners C-1, C-2, . . . , C-N, respectively; CP-1, CP-2, . . . , CP-N represents set of configuration parameters to be provided for loading to the actuator control module of the single corners C-1, C-2, C-N, respectively.

In this configuration, also named system fully decentralized (B-b-W decentralized—full), the distribution of the electronic control units and of the wheel slip control sub-modules is based on the corners of the vehicle 1.

Such a configuration, in an embodiment, may provide the presence of an electronic control unit for each corner and a wheel slip control sub-module for each control unit related to the associated corner.

For example, with reference to FIG. 3a, the corner C-1 may be the front left corner to which the first wheel slip control sub-module C-FL corresponds.

According to a further embodiment, adapted to provide greater flexibility, an electronic control unit may be configured to implement multiple corner wheel slip control sub-modules while other electronic control units are not configured to implement any wheel slip control sub-module.

According to a further embodiment, shown in FIG. 3b, the system 100, in particular, the plurality of wheel slip control submodules 103 distributed on single axles A-1, A-2, . . . , A-N of the vehicle 1, can be configured to control, in a coordinated manner, a number of axles fewer than or equal to the overall number of axles of the vehicle 1.

In this configuration, also named system partially decentralized (B-b-W decentralized—partial), the distribution of the electronic control units and of the wheel slip control sub-modules is based on the axles of the vehicle 1.

In an embodiment, this configuration may provide the presence of an electronic control unit for each axle and a wheel slip control sub-module for each control unit related to the corners associated with the axle.

For example, with reference to FIG. 3b, the single axle A-1 may be the front axle and can contain the first wheel slip control sub-module C-FL and the second wheel slip control sub-module C-FR.

According to a further embodiment, adapted to provide greater flexibility, an electronic control unit may be configured to implement multiple wheel slip control sub-modules of an axle.

According to a further embodiment, shown in FIG. 3c, the system 100, in particular, the slip control module 101 if the latter is centralized, is configurable to control in a coordinated manner a number of corners of the vehicle 1 either fewer than or equal to the total number of corners of the vehicle 1.

In this configuration, also named centralized system (B-b-W centralized) there is a single electronic control unit containing the plurality of wheel slip control sub-modules 103 of the single corners C-1, C-2, C-N of the vehicle 1.

In FIG. 3c: BR-1, BR2, . . . , BR-N are commands representing braking requests for the single corners C-1, C-2, C-N, respectively; MC-1, MC-2, . . . , MC-N represent control modes of the actuator control module of the single corners C-1, C-2, . . . , C-N, respectively; CP-1, CP-2, . . . , CP-N represent set of configuration parameters to be provided for loading to the actuator control module of the single corners C-1, C-2, C-N, respectively.

With reference now to FIGS. 4a-4g, the slip control module 101 will be described in greater detail.

It is worth noting that from a software point of view, the wheel slip control module 101, and thus each wheel slip control sub-module of the plurality of wheel slip control modules 103, is configured to execute a method for controlling the wheel slip in a braking system of a vehicle, as will be described below.

The slip control module 101 comprises an input interface module 40.

For example, the input interface module 40 is a hardware module or software logic module in a main hardware module of the braking system or more in general of the vehicle 1.

The input interface module 40 is configured to receive input information MD representative of the vehicle 1, previously introduced with reference to FIGS. 1 and 2, and information MS representative of an estimate of the status of the vehicle.

The information MD representative of the vehicle 1 is provided by components with which the vehicle 1 is equipped, e.g. such as sensors and/or a CAN (Controller Area Network) network and/or one or more electronic control units of the single corners of the vehicle.

Figure 4A:
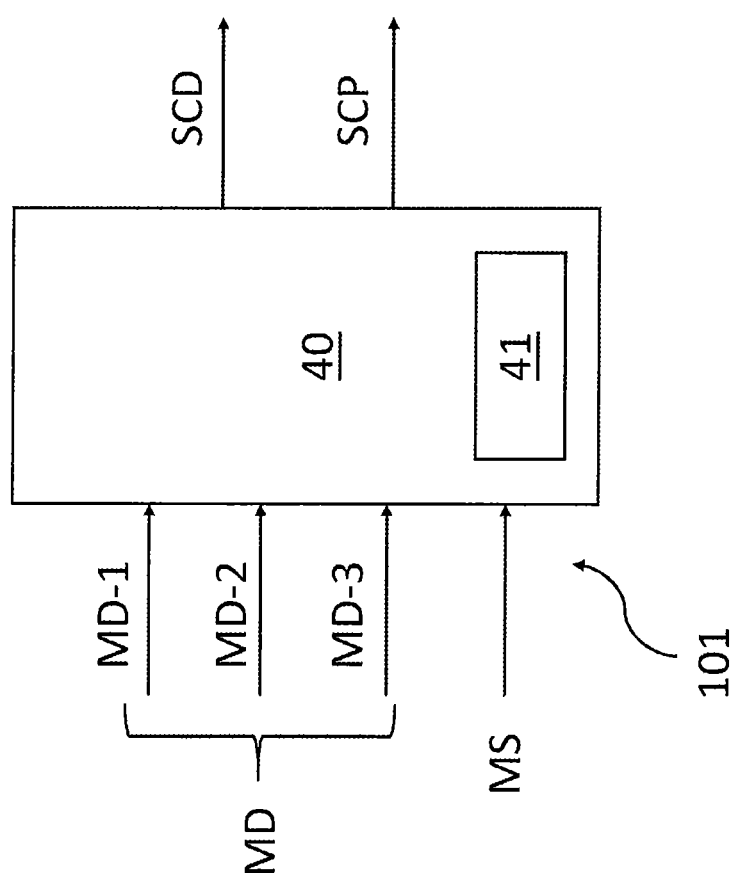

In this regard, as shown in FIG. 4a, the information MD representative of the vehicle comprises one or more of the following groups of information:
- a first group of information MD-1 detectable by sensors with which the vehicle 1 is equipped;
- a second group of information MD-2 detectable by the CAN network or other data communication channel of the vehicle 1; and
- a third group of information MD-3 detectable by one or more electronic control units of a single vehicle corner.

It is worth noting that this third group of information MD-3 further comprises information detectable in a vehicle corner other than the vehicle corner to which the slip control module 101 relates.

Instead, the information MS representative of an estimate of the status of the vehicle is provided by an estimate module MSV (shown only in FIG. 6) of the status of the vehicle.

For example, the estimate module MSV of the status of the vehicle is a hardware module or software logic module in a main hardware module of the braking system or more in general of the vehicle 1.

In an embodiment, the module MSV may be internal to the system 100.

According to a further embodiment, alternative to the preceding one, the module MSV may be external to the system 100.

Returning to the input interface module 40, it is configured to output input wheel slip control information SCD, i.e., which will be provided as input to further modules of the slip control module 101 arranged downstream of the input interface module 40.

The input wheel slip control information SCD is essential information for controlling the wheel slip by the wheel slip control module 101, and is selected by the interface module 40 from the information MD representative of the vehicle 1 and information MS representative of an estimate of the status of the vehicle.

In more detail, the input wheel slip control information SCD comprises at least:
- wheel speed (detectable by sensors aboard the vehicle);
- longitudinal acceleration of the vehicle (detectable by sensors aboard the vehicle);
- side acceleration of the vehicle (detectable by sensors aboard the vehicle);
- yaw rate (detectable by sensors aboard the vehicle);
- vehicle speed (provided by the estimate module of the status of the vehicle);
- wheel slip (provided by the estimate module of the status of the vehicle);
- road grip (provided by the estimate module of the status of the vehicle);
- wheel acceleration (provided by the estimate module of the status of the vehicle);
- side slip angles (provided by the estimate module of the status of the vehicle);
- side wheel slip (provided by the estimate module of the status of the vehicle);
- identification of the vehicle maneuverer type (provided by the estimate module of the status of the vehicle); and
- status information of the other vehicle corners (described below, SlipControlEnable, SCE, SP-V setpoint value of a control variable to be applied to the respective vehicle corner).

Referring again to FIG. 4a, the input interface module 40 comprises a parameter self-loading module 41.

For example, the parameter self-loading module 41 is a software module or software logic module in a main hardware module of the braking system or more in general of the vehicle 1.

The parameter self-loading module 41 is configured to determine, based on the information MD representative of the vehicle 1 and the information MS representative of an estimate of the status of the vehicle 1, wheel slip control parameters SCP used by the control logic of the wheel slip control module 101.

The wheel slip control parameters SCP are the parameters used in the formulas/laws for controlling the further modules of the wheel slip control module 101 arranged downstream of the input interface module 40 and described hereafter with reference to FIGS. 4b-4g.

Some examples of these parameters are the gains and the time constants of the controllers, the slip setpoint tables, and the trigger thresholds for the aforesaid modules.

Examples of determination are indicated in the following sections in terms of loading the parameter set as a function of a road grip.

The wheel slip control parameters SCP may be divided into discrete subsets or may be determined as outputs of interpolation functions based on the information MD representative of the vehicle 1 and the information MS representative of an estimate of the status of the vehicle 1.

According to an embodiment, the wheel slip control parameters SCP may be divided into various subsets relative to various road grips ("high grip", "medium grip", "low grip") and according to the estimated road grip received from the estimate module of the status of the vehicle 1, and the parameter self-loading module 41 is configured to load the corresponding subset of wheel slip control parameters SCP.

According to a further embodiment, alternative to the preceding one, the parameter self-loading module 41 is configured to determine a wheel slip control parameter SCP as a function of the estimated road grip received from the estimate module of the status of the vehicle 1, e.g.:

Parameter SCP=Default Parameter SCP×function(Default Grip/Estimated Grip), where:
  Default parameter SCP: associated/calibrated parameter for default grip (e.g. specific gain of wheel slip control module);
  function=interpolation logic to adapt the parameter to the estimated grip (e.g., with linear interpolation logic: Parameter SCP=Default Parameter SCP×(Default Grip/Estimated Grip);
  Default Grip: high grip, dry asphalt, $\mu=1$.

Figure 4C:
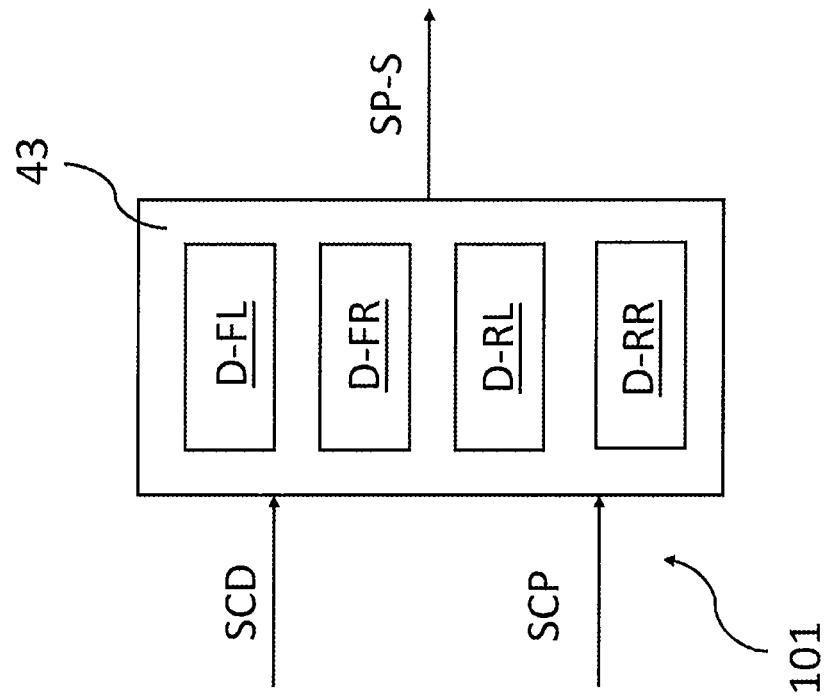
Figure 4B:
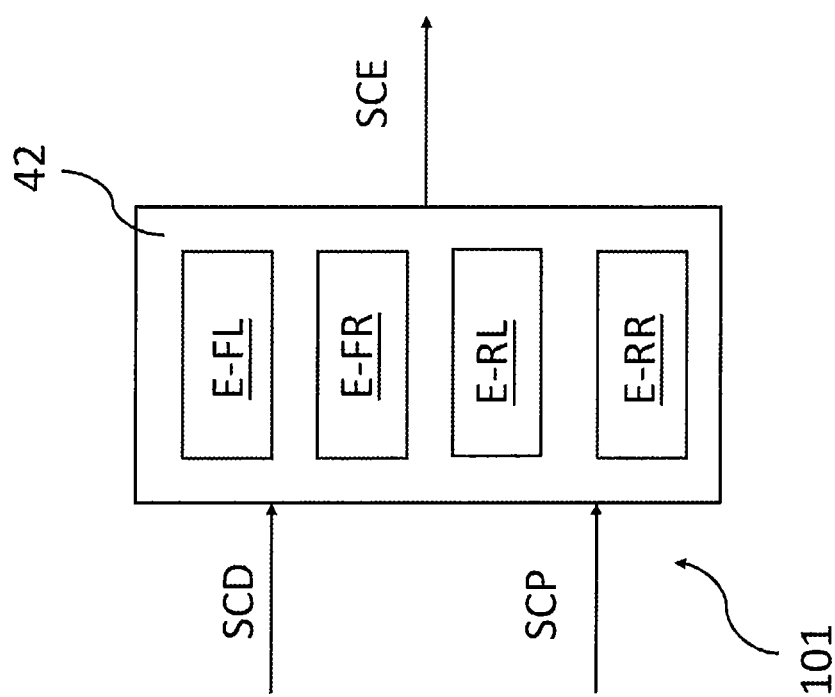

With reference to FIG. 4b, the wheel slip control module 101 further comprises a plurality of wheel slip control enabling modules 42.

For example, each wheel slip control enabling module of the plurality of wheel slip control enabling modules 42 is a software module or software logic within a main hardware module of the braking system or more generally of the vehicle 1.

The plurality of wheel slip control enabling modules 42 comprises at least one wheel slip control enabling module for each corner of the vehicle.

For example, with reference to FIG. 4b, the plurality of wheel slip control enabling modules 42 comprises:
- a first enabling module E-FL of the front left corner wheel slip control;
- a second enabling module E-FR of the front right corner wheel slip control;
- a third enabling module E-RL of the rear left corner wheel slip control; and
- a fourth enabling module E-RR of the rear right corner wheel slip control.

The plurality of wheel slip control enabling modules 42 is configured to generate a plurality of enabling signals SCE of the wheel slip control, based on the received input wheel slip control information SCD and the determined wheel slip control parameters SCP.

In greater detail, each wheel slip control enabling module of the plurality of wheel slip control enabling modules 42 is configured to determine a respective enabling signal of the plurality of enabling signals SCE of the wheel slip control, based on the received input wheel slip control information SCD and the determined wheel slip control parameters SCP.

It is worth noting that the wheel slip control enabling module 42 is configured to enable wheel slip control upon detection of impending loss of wheel stability and/or vehicle stability.

For example, the wheel slip control enabling module 42, by assessing a wheel slip estimate evaluation (WheelSlip) and comparing such an evaluation with function threshold values of the status of the vehicle (SlipThreshold [f(vehicle speed, road grip, brake pedal speed, wheel acceleration)]), is configured to detect the impending loss of wheel stability and thus enable (True) the wheel slip control of one or more corners of the vehicle:

If WheelSlip >=SlipThreshold [f(vehicle speed, road grip, brake pedal speed)] then SlipControlEnable (SCE)=True.

According to a further embodiment, diagrammatically shown in FIG. 4c, in combination with the preceding ones, the slip control module 101 further comprises a plurality of wheel slip setpoint definition modules 43.

For example, each wheel slip setpoint definition module of the plurality of wheel slip setpoint definition modules 43 is a software module or software logic within a main hardware module of the braking system or more generally of the vehicle 1.

The plurality of wheel slip setpoint definition modules 43 comprises at least one wheel slip setpoint definition module for each corner of the vehicle.

With reference to FIG. 4c, the plurality of wheel slip setpoint definition modules 43 comprises:
 a first definition module D-FL of a first wheel slip setpoint for the front left corner;
 a second definition module D-FR of a second wheel slip setpoint for the front right corner;
 a third definition module D-RL of a third wheel slip setpoint for the rear left corner; and
 a fourth definition module D-RR of a fourth wheel slip setpoint for the rear right corner.

The plurality of wheel slip setpoint definition modules 43 is configured to generate wheel slip setpoints SP-S based on the received input wheel slip control information SCD and the determined wheel slip control parameters SCP.

In an embodiment, a slip setpoint is a constant value named reference slip setpoint defined by the parameter self-loading module 41 of the input interface module 40.

According to a further embodiment, in combination with the preceding one, a slip setpoint is determined, by the respective definition module, starting from the respective reference slip setpoint as a function of the information MS representative of an estimate of the status of the vehicle.

The plurality of wheel slip setpoint definition modules 43 is configured to modulate, based on the received input wheel slip control information SCD and the determined wheel slip control parameters SCP, for each single corner of the vehicle, the reference wheel slip setpoint to obtain in real-time the optimal wheel slip setpoint for advantageously maximizing dynamic performance during vehicle braking.

For example, the wheel slip setpoint (Slipsetpoint) can be modulated starting from the reference wheel slip setpoint (SlipSetpoint reference) as a function of the road grip and side acceleration of the vehicle:

Slipsetpoint=SlipSetpoint Reference*f(Road Grip, Side Acceleration).

Figure 4E:
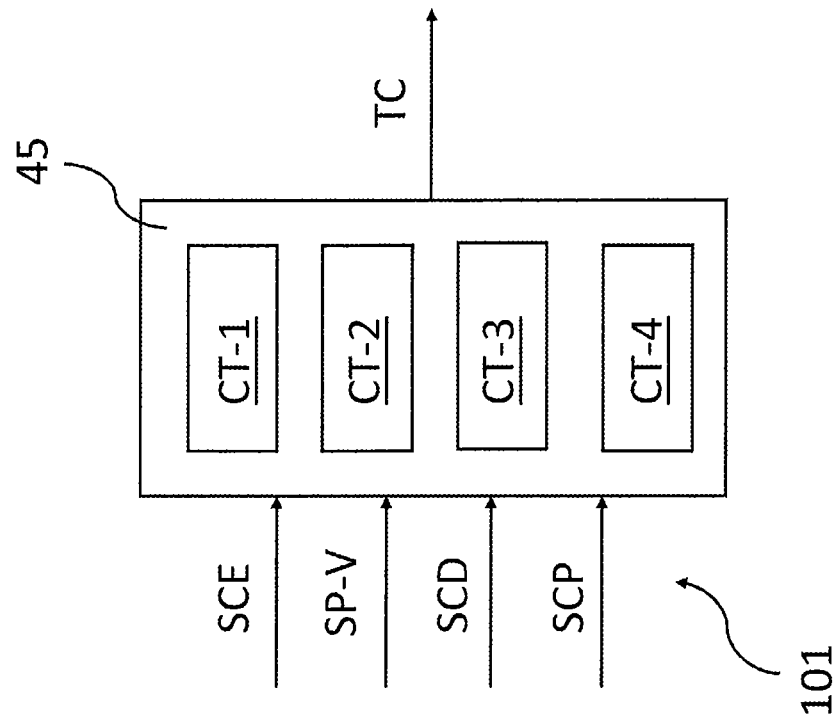
Figure 4D:
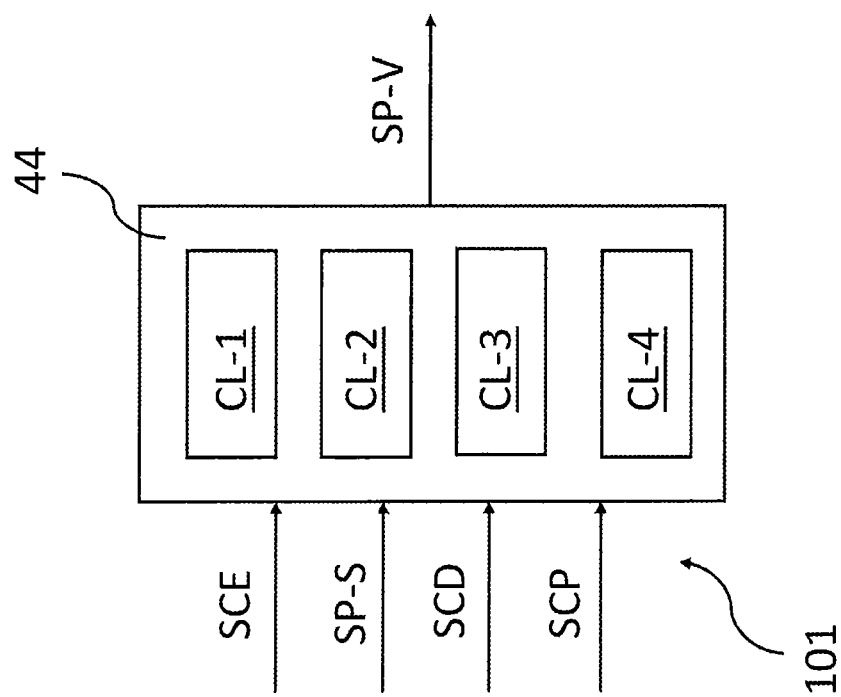

Referring to FIG. 4d, the slip control module 101 further comprises a plurality of closed-loop wheel slip control modules 44.

For example, each closed-loop wheel slip control module of the plurality of closed-loop wheel slip control modules 44 is a software module or software logic within a main hardware module of the braking system or more generally of the vehicle 1.

The plurality of wheel slip closed-loop control modules 44 comprises at least one closed-loop wheel slip control module for each corner of the vehicle.

Referring to FIG. 4d, the plurality of closed-loop wheel slip control modules 44 comprises:
 a first closed-loop wheel slip control module CL-1 for the front left corner;
 a second closed-loop wheel slip control module CL-2 for the front right corner;
 a third closed-loop wheel slip control module CL-3 for the rear left corner; and
 a fourth closed-loop wheel slip control module CL-4 for the rear right corner.

Each closed-loop wheel slip control module, comprising software adjustment logics (e.g. a PID-type control, acronym of Proportional-Integral-Derivative), is configured to determine, at each execution cycle of the respective software, based on the defined slip setpoint SP-S and an estimated wheel slip value, a setpoint value SP-V of a control variable to be applied to the respective vehicle corner, to minimize the error between the defined slip setpoint SP-S and the estimated wheel slip value.

Examples of control variables are force or position or electric voltage or pressure or torque or electric current which can be implemented through the respective actuator on the vehicle corner.

In an embodiment, in combination with the preceding one, each closed-loop wheel slip control module comprises software logics for initializing or resetting control logic based on discrete events (control activation and/or exceeding error thresholds and/or event-driven logic for reducing or increasing the required force) to advantageously make control variation faster in the face of rapid changes in operating conditions.

According to a further embodiment, diagrammatically shown in FIG. 4e, in combination with the proceeding ones, the slip control module 101 further comprises a plurality of reference target correction modules 45.

"Reference target" means the set-point value SP-V of a control variable to be applied to the respective vehicle corner, determined by a closed-loop wheel slip control module, described above.

For example, each reference target correction module of the plurality of reference target correction modules 45 is a software module or software logic within a main hardware module of the braking system or more generally of the vehicle 1.

The plurality of reference target correction modules 45 comprises at least one reference target correction module for each corner of the vehicle.

With reference to FIG. 4e, the plurality of target correction modules 45 comprises:
 a first reference target correction module CT-1 for the front left corner;
 a second reference target correction module CT-2 for the front right corner;
 a third reference target correction module CT-3 for the rear left corner; and
 a fourth reference target correction module CT-4 for the rear right corner.

The plurality of reference target correction modules 45 is configured to correct (overwrite and/or reduce) a reference target value that it receives as input by providing a corrected reference target value TC as output, based on discrete events (exceeding a threshold value for slip and/or exceeding a threshold value for wheel acceleration and/or open-loop control request of the single corner).

It is worth noting that the plurality of reference target correction modules 45 is configured to correct the reference target value by implementing a non-linear variation.

The non-linear variation of the control variable makes it possible to increase the responsiveness of the control given rapid changes in the controlled variables, e.g. by reducing the force value in the presence of high wheel accelerations (WheelAcc):

If WheelAcc >=WheelAccThreshold [f(vehicle speed, road grip, . . . )] then ForceTarget=ForceTarget−ForceCompensation), wherein:
 WheelAcc=wheel acceleration (from input wheel slip control information SCD);
 WheelAccThreshold=acceleration threshold at which compensation is performed;
 ForceTargetOut=force TC (corrected reference target value) output from the plurality of reference target correction modules 45;
 ForceTargetIn=force SP_V (setpoint value) input to the plurality of reference target correction modules 45; and
 ForceCompensation=force compensation value (contained in the wheel slip control parameters SCP).

Referring now also to FIG. 4f, in combination with the preceding ones, the slip control module 101 further comprises a plurality of coordination modules 46 of the forces FC defined for the corners of the individual vehicle axle.

For example, each force coordination module defined for the corners of the individual vehicle axle of said plurality is a software module or software logic within a main hardware module of the braking system or more generally of the vehicle 1.

The plurality of coordination modules 46 comprises at least one force coordination module defined for the corners of the individual vehicle axle for each corner of the vehicle.

Referring to FIG. 4f, the plurality of force coordination modules 46 of the forces defined for the corners of the individual vehicle axle comprises:
 a first coordination module FA-S of the forces defined for the corners of the front axle, in particular, adapted to provide a first slip control force FC-1 of the front left corner of the vehicle and a second slip control force FC-2 of the front right corner of the vehicle; and
 a second coordination module RA-S of the forces defined for the corners of the rear axle, in particular adapted to provide a third slip control force FC-3 of the rear left corner of the vehicle and a fourth slip control force FC-4 of the rear right corner of the vehicle.

The plurality of coordination modules 46 is configured to define, based on a reference target value TC (setpoint value) of the control variable provided by the preceding modules, a saturation on the maximum and/or minimum force which can be required for the single corner of each axle by evaluating the grip, vertical load, stability and speed conditions of the vehicle.

The limitation allows and optimizes the coordination of the logic defined for each corner/side of the vehicle to guarantee the overall stability of the vehicle.

For example, in the presence of different road grip on the two sides of the vehicle, the high grip side can be limited according to the road grip and the vehicle speed with the following logic:

Force saturation on high-grip side=required force on low-grip side+force value defined by a mathematical function which receives vehicle information as input.

According to a further embodiment, diagrammatically shown in FIG. 4g, the slip control module 101 further comprises a plurality of configuration interface modules 47 of an actuator control module present in each actuator module of the plurality of actuator modules 102.

For example, each configuration interface module of the plurality of configuration interface modules 47 is a software module or software logic within a main hardware module of the braking system or more generally of the vehicle 1.

The plurality of configuration interface modules 47 comprises at least one configuration interface module of an actuator control module for each corner of the vehicle.

For example, with reference to FIG. 4g, the plurality of configuration interface modules 47 comprises:
 a first configuration interface module CNF-1 of the front left corner actuator control module;
 a second configuration interface module CNF-2 of the front right corner actuator control module;
 a third configuration interface module CNF-3 of the rear left corner actuator control module; and
 a fourth configuration interface module CNF-4 of the rear right corner actuator control module.

Each configuration interface module of the plurality of configuration interface modules 47 is configured to define a control (logic) mode MC of the actuator control module of the respective vehicle corner.

Furthermore, each interface configuration module of the plurality of interface configuration modules 47 is configured to define a set of configuration parameters CP to be provided for loading to the actuator control module of the respective corner of the vehicle.

As illustrated in FIG. 4g:
 the first configuration interface module CNF-1 is configured to define a first control mode MC-1 of the front left corner actuator control module and a first set of configuration parameters CP-1 to be provided for loading to the front left corner actuator control module;
 a second interface module CNF-2 is configured to define a second control mode MC-2 of the front right corner actuator control module and a second set of configuration parameters CP-2 to be provided for loading to the front right corner actuator control module;
 a third interface module CNF-3 is configured to define a third control mode MC-3 of the rear left corner actuator control module and a third set of configuration parameters CP-3 to be provided for loading to the rear left corner actuator control module; and
 a fourth interface module CNF-4 is configured to define a fourth control mode MC-4 of the rear right corner actuator control module and a fourth set of configuration parameters CP-4 to be provided for loading to the rear right corner actuator control module.

In greater detail, each configuration interface module of the plurality of configuration interface modules 47 is configured to define for the actuator control is module of the respective corner of the vehicle the most suitable configuration in terms of control (logic) mode MC and in terms of the configuration parameter set CP to be provided for loading, based on the received input wheel slip control information SCD (such as single corner information), based on the wheel slip control parameters SCP, such as individual wheel conditions (slip and/or high acceleration, tire/road grip conditions), based on the information MS representative of an estimate of the status of the vehicle (vehicle speed, maneuver type, road type, vehicle instability conditions), and based on a setpoint value SP-V (see FIG. 4d) of a control variable (e.g., a force) to be applied to the respective vehicle corner.

The control (logic) mode MC represents the different control modes which can be activated to control an actuator.

A specific control mode is distinguished from another by the type of control module and/or control architecture (e.g., position control or actuator force control).

The configuration parameter sets are used for the specific control mode MC which is activated.

For example, in the presence of the activation of a high-grip slip control mode MC, a configuration interface module implements, as control mode MC, e.g., a closed-loop force control mode to maximize the modulation speed, and the specific configuration parameters for controlling the expected high-grip forces as a set of configuration parameters CP.

With reference to the aforesaid figures the block chart in FIG. 5, a method 500 for controlling the wheel slip control in a braking system of vehicle according to the present invention will now be described.

It is worth noting that the components and information mentioned below with the description of the method have already been described previously with reference to the system 100 and will therefore not be repeated for the sake of brevity.

The method 500 comprises a symbolic step of starting ST.

The method 500 comprises a step of receiving 501, by an input interface is module 40 of a slip control module 101, information MD representative of the vehicle 1, and information MS representative of an estimate of the status of the vehicle.

The method 500 further comprises a step of outputting 502, by the input interface module 40, input wheel slip control information SCD.

The method 500 further comprises a step of determining 503, by a parameter self-loading module 41 of the input interface module 40, based on the information MD representative of the vehicle 1 and the information MS representative of an estimate of the status of the vehicle 1, wheel slip control parameters SCP.

According to an embodiment, the wheel slip control parameters SCP may be divided into various subsets relating to different road grip ("high grip", "medium grip", "low grip") and as a function of the estimated road grip received from the estimate module of the status of the vehicle 1.

In this embodiment, the step of determining 503 comprises a step of loading 504, by the parameter self-loading module 41 of the input interface module 40, a corresponding subset of wheel slip control parameter SCP.

According to a further embodiment, alternative to the preceding one, the step of determining 503 is executed, by the parameter self-loading module 41 of the input interface module 40, for determining a wheel slip control parameter SCP as a function of the estimated road grip received from an estimate module MSV of the status of the vehicle 1.

Figure 5:
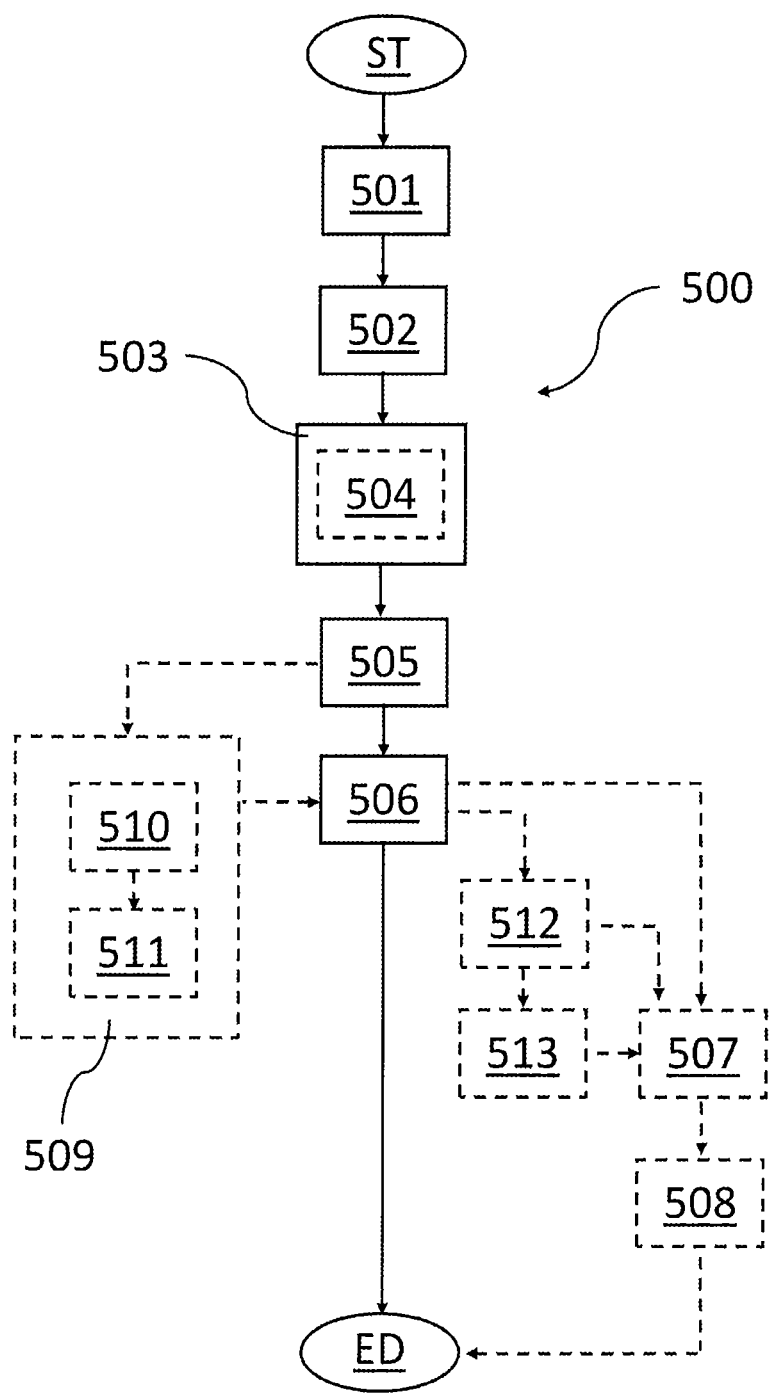
FIG. 5 shows, by means of a block diagram, a method for controlling the wheel slip in a braking system of a vehicle, according to an embodiment of the invention.

Turning in general to FIG. 5, the method 500 further comprises a step of determining 505, by a plurality of wheel slip control enabling modules 42 of the slip control module 101, a plurality of enabling signals SCE of the wheel slip control, based on the received input wheel slip control information SCD and the determined wheel slip control parameters SCP.

The method 500 further comprises a step of determining 506, by each closed-loop wheel slip control module of a plurality of closed-loop wheel slip control modules 44 of the slip control module 101, based on a defined slip setpoint SP-S and an estimated wheel slip value, a setpoint value SP-V of a control variable to be applied to the respective vehicle corner, to minimize the error between the defined slip setpoint SP-S and the estimated wheel slip value.

The method 500 comprises a symbolic step of ending ED.

According to an embodiment (shown in FIG. 5 with dashed lines), in combination with any one of the preceding one, the method 500 comprises, subsequent to the step of determining 506, steps of:

defining 507, by each interface configuration module of a plurality of interface configuration modules 44 of an actuator control module present in each actuator module of a plurality of actuator modules 102, a control (logic) mode MC of the actuator control module of the respective corner of the vehicle 1; and defining 508, by each interface configuration module of the plurality of interface configuration modules 44 an actuator control module presents in each actuator module of a plurality of actuator modules 102, a set of configuration parameters CP to be provided for loading to the actuator control module of the respective corner of the vehicle 1.

In an embodiment, in combination with any one of the preceding ones (shown in FIG. 5 with dashed lines), the method 500 comprises, between the step of determining 505 and the step of determining 506, a step of generating 509, by a plurality of wheel slip setpoint definition modules 43 of the slip control module 101, slip setpoints SP-S based on the received input wheel slip control information SCD and the determined wheel slip control parameters SCP.

In an embodiment (shown by the dashed lines in FIG. 5), in combination with the preceding one, the step of generating 509 comprises a step of providing 510, by the parameter self-loading module 41 of the input interface module 40, a constant slip setpoint value as the reference slip setpoint.

In a further embodiment (again shown with dashed lines in FIG. 5), in combination with the preceding one, the step of generating 509 further comprises a step of determining 511, by the respective definition module, a slip setpoint starting from the respective reference slip setpoint as a function of the information MS representative of an estimate of the status of the vehicle 1.

According to a further embodiment (shown with dashed lines in FIG. 5), in combination with one of those described above, the method 500 further comprises, between the step of determining 506 and the step of defining 507, a step of correcting 512, by a plurality of reference target correction modules 45 of each wheel slip control module, based on discrete events (exceeding a wheel slip threshold value and/or exceeding a wheel acceleration threshold value and/or requesting open-loop control of the single corner), a respective reference target value received at the input, then outputting a corrected reference target value TC.

According to a further embodiment (shown with dashed lines in FIG. 5), in combination with the preceding one, the method 500 further comprises, between the step of correcting 512 and the step of defining 507, a step of defining 513, by a plurality of coordination modules 46 of the forces FC defined for the corners of a single axle of the vehicle, based on a setpoint value of the control variable, a saturation on the maximum and/or minimum force, which can be requested for the single corner of each axle, evaluating the conditions of grip, vertical loading, stability, and speed of the vehicle.

Figure 6:
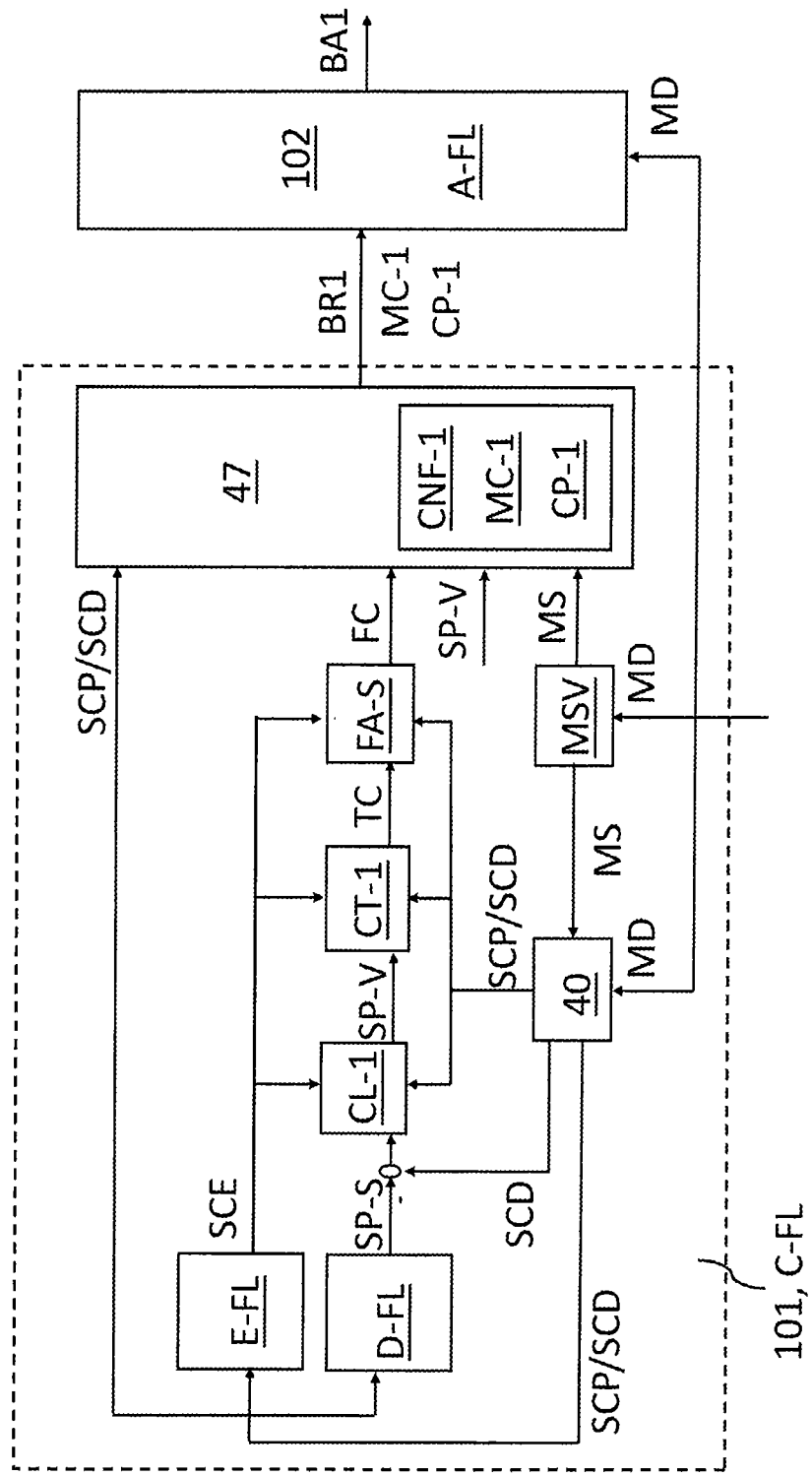
FIG. 6 shows, by means of a block chart, an example of the operation of a component of a system for controlling the wheel slip in a braking system of a vehicle.

With reference to FIG. 6, an example of the operation of a slip control module 101 will now be described.

The input interface module 40 is configured to receive in input information MD representative of the vehicle 1, previously introduced with reference to FIGS. 1 and 2, and information MS representative of an estimate of the status of the vehicle provided by the estimate module MSV of the status of the vehicle.

The input interface module 40 outputs input wheel slip control information SCD and, through the parameter self-loading module 41, determines, based on information MD representative of the vehicle 1 and the information MS representative of an estimate of the status of the vehicle 1, wheel slip control parameters SCP.

The first slip control enabling module E-FL generates a first wheel slip control enabling signal SCE of the front left corner based on the determined wheel slip control parameters SCP and input wheel slip control information SCD.

The first wheel slip setpoint definition module D-FL of the front left corner generates a first wheel slip setpoint SP-S based on the determined wheel slip control parameters SCP and based on the received input wheel slip control information SCD.

The first closed-loop wheel slip control module CL-1 for the front left corner, after having received the first enabling signals SCE determines a setpoint value SP-V of a control variable to be applied to the respective vehicle corner, at each execution cycle of the respective software, based on a defined slip setpoint SP-S and an estimated wheel slip value, to minimize the error between the defined slip setpoint SP-S and the estimated wheel slip value.

The first reference target correction module CT-1 for the front left corner, upon receipt of the first enable signal SCE, corrects (overwrites and/or reduces) a reference target value it receives as input providing a corrected reference target value TC as output, based on discrete events (exceeding a slip threshold value and/or exceeding a wheel acceleration threshold value and/or open-loop control request of the single corner).

The first coordination module FA-S of the forces defined for the front axle corners provides a first slip control force F1 of the front left corner of the vehicle.

The first configuration interface module CNF-1 of the front left corner actuator control module defines a first control mode MC-1 of the front left corner actuator control module and a first set of configuration parameters CP-1 to be provided for loading to the first front left corner actuator control module A-FL, which applies a first braking action BA1 to the front left wheel W-FL of the vehicle 1.

It is worth noting that the object of the present invention is fully achieved.

The method and respective system for controlling wheel slip in a braking system of a vehicle of the present invention are specific for a Brake-by-Wire architecture, with the possibility of configuring the control mode of the single vehicle corner as a function of the wheel and/or vehicle status evaluations determined by control and supervisory algorithm.

The method and the respective control system can manage the wheel slip in a specific and optimized manner for a Brake-by-Wire system, in which in one or more control units is defined the control system of the vehicle braking logics, the logics related to the control of the corner/wheel and the logics related to the control of the actuator and in which each corner is provided with a B-b-W actuator.

Furthermore, the method and respective control system of the present invention specifies the control mode by which the wheel slip control module configures the single corner actuator control module according to the status of the wheel and/or of the vehicle, selecting the optimal configuration and set of parameters to prioritize and optimize control responsiveness and performance rather than braking comfort.

Moreover, the method and respective control system of the present invention have a modularity/flexibility to vary the vehicle category due to the possibility of coordination between corners of the vehicle.

Furthermore, the method and respective system of the invention can continuously adapt the control logic based on measurement and estimation of vehicle distribution signals, by virtue of a more comprehensive architectural configuration and information/estimation/evaluation on vehicle distribution.

Moreover, the method and respective control system of the present invention guarantees:
- a continuous modulation of wheel slip control;
- a greater simplicity of calibration of the control logic because it is based on physical laws which allow the use of a theoretical calibration to support empirical/experimental techniques instead of typically empirical/experimental methodologies; and
- an adaption of the control mode/actuator control parameters as a function of the control logic of the wheel slip control module of the respective vehicle corner.

A person skilled in the art may make changes and adaptations to the embodiment of the method and respective system described above or can replace elements with others which are functionally equivalent to satisfy contingent needs without departing from the scope of protection of the appended claims. All the features described above as belonging to one possible embodiment may be implemented independently from the other described embodiments.

The invention claimed is:
1. A method for controlling wheel slip in a braking system of a vehicle, the method comprising:
  receiving, by an input interface module of a slip control module, information representative of the vehicle and information representative of an estimate of the status of the vehicle;
  outputting, by the input interface module, input wheel slip control information;
  determining, by a parameter self-loading module of the input interface module, based on the information representative of the vehicle and the information representative of an estimate of the status of the vehicle, wheel slip control parameters;
  determining, by a plurality of wheel slip control enabling modules of the slip control module, a plurality of enabling signals of wheel slip control, based on the received input wheel slip control information and the determined wheel slip control parameters; and
  determining, by each closed-loop wheel slip control module of a plurality of closed-loop wheel slip control modules of the slip control module, based on a defined slip setpoint and an estimated wheel slip value, a setpoint value of a control variable to be applied to a respective corner of the vehicle, to minimize error between the defined slip setpoint and the estimated wheel slip value,
  and further comprising, following the step of determining the setpoint value of the control variable to be applied to the respective corner of the vehicle,
  defining, by each interface configuration module of a plurality of interface configuration modules of an actuator control module present in each actuator mod- ule of a plurality of actuator modules, a control mode of the actuator control module of the respective corner of the vehicle; and defining, by each interface configuration module of the plurality of interface configuration modules of an actuator control module present in each actuator module of a plurality of actuator modules, a set of configuration parameters to be provided for loading to the actuator control module of the respective corner of the vehicle.

2. The method of claim 1, comprising, between the step of determining the plurality of enabling signals of the wheel slip control and the step of determining the setpoint value of the control variable to be applied to the respective corner of the vehicle, generating, by a plurality of wheel slip setpoint definition modules of the slip control module, slip setpoints based on the received input wheel slip control information and the determined wheel slip control parameters.

3. The method of claim 2, wherein the step of generating the slip setpoints based on the received input wheel slip control information and the determined wheel slip control parameters, comprises providing, by the parameter self-loading module of the input interface module, a constant slip setpoint value as reference slip setpoint.

4. The method of claim 3, wherein the step of generating, the slip setpoints based on the received input wheel slip control information and the determined wheel slip control parameters further comprises determining, by a respective definition module, a slip setpoint from a respective reference slip setpoint as a function of the information representative of an estimate of the status of the vehicle.

5. The method of claim 1, further comprising, between the step of determining the setpoint value of the control variable to be applied to the respective corner of the vehicle and the step of defining the control mode of the actuator control module of the respective corner of the vehicle, correcting, by a plurality of reference target correction modules of the slip control module, based on discrete events, a respective reference target value received at the input, then outputting a correct reference target value.

6. The method of claim 5, further comprising, between the step of correcting the respective reference target value received at the input and the step of defining the control mode of the actuator control module of the respective corner of the vehicle, defining, by a plurality of modules for coordinating forces defined for corners of a single axle of the vehicle, based on a setpoint value of the control variable, a saturation on the maximum and/or minimum force, which can be requested for a single corner of each axle, evaluating conditions of grip, vertical loading, stability, and speed of the vehicle.

7. The method of claim 1, wherein the wheel slip control parameters are divided into different subsets related to different road grips and according to an estimated road grip received from an estimate module of the status of the vehicle, the step of determining the wheel slip control parameters comprising loading, by the parameter self-loading module of the input interface module, a corresponding wheel slip control parameter subset.

8. The method of claim 1, wherein the step of determining the wheel slip control parameters is carried out by the parameter self-loading module of the input interface module for determining a wheel slip control parameter as a function of an estimated road grip received from an estimate module of the status of the vehicle.

9. A system for controlling wheel slip in a braking system of a vehicle, the system comprising:

a slip control module; and a plurality of actuator modules, each actuator module of the plurality of actuator modules comprising a respective actuator control module and a respective actuator adapted to implement a braking command based on a control received from a respective actuator control module, the slip control module being configured to receive information representative of the vehicle and, based on the information representative of the vehicle, send one or more commands representative of braking requests to the plurality of actuator modules, the slip control module being configured to carry out the method of claim 1.

10. The system of claim 9, wherein the slip control module comprises a plurality of wheel slip control submodules distributed on single corners of the vehicle, the plurality of wheel slip control submodules being configurable to control, in a coordinated manner, a number of vehicle corners less than, or equal to the overall number of corners of the vehicle.

11. The system of claim 9, wherein the slip control module comprises a plurality of wheel slip control submodules distributed on single axles of the vehicle, the plurality of wheel slip control submodules being configurable to control, in a coordinated manner, a number of axles less than, or equal to the overall number of axles of the vehicle.

12. The system of claim 9, wherein the slip control module is centralized, the slip control module being configurable to control, in a coordinated manner, a number of corners of the vehicle less than, or equal to the overall number of corners of the vehicle.

* * * * *